3,077,470
3-[4-HYDROXY-3-(AMINOMETHYL)-PHENYL]-
4-(4-OXYPHENYL)-ALKANES AND ALKENES
Joseph H. Burckhalter, Ann Arbor, Mich., assignor to University of Kansas Research Foundation, Lawrence, Kans.
No Drawing. Filed Mar. 21, 1961, Ser. No. 97,169
9 Claims. (Cl. 260—239)

This invention relates to novel amine compounds and means of obtaining the same. More particularly, the invention relates to amine compounds which in free base form have the general formula,

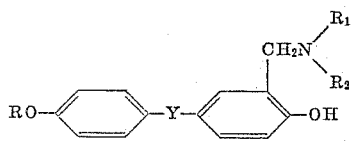

acid salts thereof and the corresponding quaternary lower alkyl ammonium salts having the general formula,

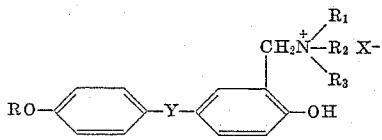

where R represents hydrogen or a lower alkyl group (i.e., an alkyl group containing from one to four carbon atoms, preferably methyl or ethyl), $R_1$ and $R_2$ independently represent lower alkyl groups (i.e., alkyl groups containing from 1 to 4 carbon atoms) or when taken together with —N represent a saturated heterocyclic radical such as pyrrolidino, piperidino, piperazino, morpholino, hexamethyleneimino and lower alkyl (i.e., 1 to 4 carbon alkyl) substituted derivates thereof, the alkyl group being substituted at the secondary nitrogen atom where present or at one or more of the heterocyclic carbon atoms, X is an anion such as a chloride, bromide, iodide, sulfate, or para-toluene sulfonate anion, $R_3$ is a lower alkyl group (i.e., an alkyl group containing from 1 to 4 carbon atoms) and Y represents a divalent hydrocarbon bridge containing not more than 3 carbon atoms optionally substituted with one or more lower aliphatic groups, such as

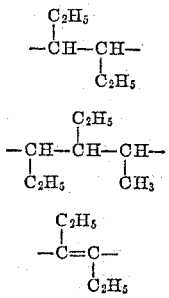

and

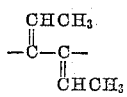

As indicated, the invention contemplates products in the free base form having the formula given above or in salt form with an inorganic or organic acid. As examples of the many acid salts contemplated by the invention there may be mentioned the mineral acid salts such as the hydrochloride, hydrobromide, hydroiodide, sulfate, phosphate and the like, and organic acid salts such as the citrate, tartrate, acetate, benzoate, phenylsulfonate, p-toluene sulfonate, sulfamate and like salts.

In accordance with the invention the new amine products are prepared by the condensation of a phenol compound having the formula,

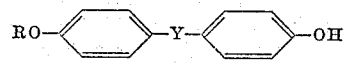

and formaldehyde, and an amine having the formula,

where $R_1$, $R_2$ and Y have the above-mentioned significance. The formaldehyde may be supplied as gaseous formaldehyde, aqueous formaldehyde or as formaldehyde generating compounds such as paraformaldehyde. In general, although the reaction can be run without added solvent, preferably, it is carried out in an inert solvent such as benzene or in an alcoholic-type solvent as examples of which may be mentioned methanol, ethanol, propanol, isopropanol and the like. The reaction proceeds merely by adding the reactants together and allowing the reaction mixture to stand at room temperature. As a preferred mode of effecting the condensation, the reaction mixture is heated at the boiling point until the reaction is substantially complete. Ordinarily the reaction is complete within 2 to 3 hours at elevated temperature and at lower temperature may require a longer reaction time.

The quaternary lower alkyl ammonium salts having the general formula indicated above are prepared in accordance with the invention by reacting the mentioned aryl ether having the general formula,

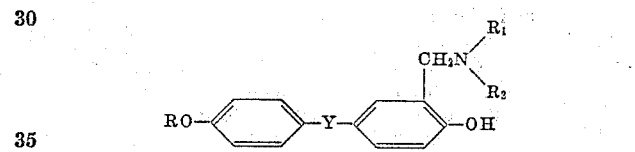

with an equivalent amount of an alkyl ester having the formula $R_3X$ such as an alkyl halide, sulfate or sulfonate; where $R_1$, $R_2$, $R_3$, X and Y have the above-mentioned significance. The reaction may be carried out over a wide range of temperature as desired, e.g., at room temperature or higher temperature. The reaction with alkyl bromides or iodides proceeds quite readily in relatively short periods of time, whereas the reaction with alkyl chlorides may require longer periods unless one employs an elevated temperature. Conveniently, the reaction may be carried out by dissolving the aryl ether starting material in an inert organic solvent such as ether, benzene and the like, and by treating solution with the alkyl ester. The resulting quaternary lower alkyl ammonium compound obtained in the reaction can be readily isolated by precipitation from solution brought about by the addition of an organic solvent in which the product is insoluble such as petroleum ether and the like. The desired product, which separates, is then conveniently recovered as by filtration, decantation, etc.

The products of the invention possess significant antibacterial properties and hence are useful as germicidal ingredients of soaps, detergents and the like. They are particularly useful when administered orally, as agents for the lowering of the cholesterol level of the blood. The compounds of the instant invention possess little or no immediate estrogenic activity, thus making the compounds particularly adaptable for administration in those conditions where it is desired to lower the cholesterol blood levels without causing the undesirable estrogenic side effects normally associated with the use of certain anti-hypercholesterolemic substances. The indicated oral dosage is in general about 1–10 mg./kg. daily. The compounds are preferably administered in acid salt form which can be obtained from the corresponding free base by dissolving the latter in a suitable solvent such as ether, treating the solution with at least one equivalent of the desired acid and recovering the solid product which separates from solution. The invention contemplates the mentioned acid addition salts and quaternary ammonium salts broadly and includes such salts whether non-toxic or toxic since any salts of the invention which are considered toxic are nevertheless useful as intermediates for the production of non-toxic salts or the corresponding free base, being readily convertible thereto by means which per se are known to those skilled in the art.

The invention is illustrated by the following examples.

*Example 1*

A mixture of 2.84 g. of hexestrol monomethyl ether, 0.3 g. of paraformaldehyde and 0.71 g. of pyrrolidine in 25 ml. of absolute ethanol is heated under reflux on a steam bath for two hours. The solvent is removed and the residual product, 3-[4-hydroxy-3-(1-pyrrolidinylmethyl)-phenyl]-4-(4-methoxyphenyl) - hexane, is dissolved in ether. An excess of hydrogen chloride is added to the solution, the solid removed by filtration and recrystallized from acetonitrile. The crystalline product is 3-[4-hydroxy-3-(1-pyrrolidinylmethyl)-phenyl] - 4 - (4-methoxyphenyl)-hexane hydrochloride, M.P. 183–184.5° C.

*Example 2*

A mixture of 0.3 g. of paraformaldehyde and 1.6 ml. of 30% ethanolic dimethylamine in 25 ml. of absolute ethanol is warmed until a clear solution is formed. This solution is cooled to room temperature and added to 2.84 g. of hexestrol monomethyl ether in 15 ml. of absolute ethanol. The resulting mixture is allowed to stand at room temperature for one hour and then heated at reflux for 16 hours. The alcohol is removed under reduced pressure and the residual product, 3-(4-hydroxy-3-dimethylaminomethylphenyl)-4-(4-methoxyphenyl) - hexane, is dissolved in ether. Dry hydrogen chloride gas is passed into the solution until it is saturated. Additional ether is added and the white precipitate is removed by filtration and recrystallized from a mixture of acetone and ethyl acetate. This product is 3-(4-hydroxy-3-dimethylaminomethylphenyl)-4-(4-methoxyphenyl) - hexane hydrochloride, M.P. 181° C.

*Example 3*

A mixture of 0.3 g. of paraformaldehyde and 0.8 g. of diethylamine is warmed with 25 ml. of absolute ethanol until a clear solution is formed. This solution is cooled to room temperature and added to 15 ml. of absolute ethanol containing 2.84 g. of hexestrol monomethyl ether. The resulting mixture is allowed to stand at room temperature for one hour and then heated at reflux for 16 hours. The alcohol is removed under reduced pressure and the residual product, 3-(4-hydroxy-3-diethylaminomethylphenyl)-4-(4-methoxyphenyl)-hexane, dissolved in ether. Dry hydrogen chloride gas is passed into the solution until it is saturated and the white precipitate removed by filtration and recrystallized first from alcohol and petroleum ether (1:1), and then from acetone and petroleum ether (1:1). The product is 3-(4-hydroxy-3-diethylaminomethylphenyl)-4-(4-methoxyphenyl) - hexane hydrochloride, M.P. 166.5° C.

*Example 4*

A mixture of 0.3 g. of paraformaldehyde and 0.9 g. of morpholine is warmed in 25 ml. of absolute ethanol until a clear solution is formed. The solution is cooled to room temperature and added to 15 ml. of alcoholic solution of 2.84 g. of hexestrol monomethyl ether. The resulting mixture is allowed to stand at room temperature for one hour and then heated at reflux temperatures for 16 hours. The alcohol is removed under reduced pressure and the product, 3-[4-hydroxy-3-(4-morpholinylmethyl)-phenyl]-4-(4-methoxyphenyl) - hexane, is dissolved in ether. Dry hydrogen chloride gas is passed into the solution until it is saturated, and the white solid removed by filtration and recrystallized from a mixture of alcohol and petroleum ether. The crystalline product is 3-[4-hydroxy-3-(4 - morpholinylmethyl) - phenyl]-4-(4-methoxyphenyl)-hexane hydrochloride, M.P. 202° C.

*Example 5*

A mixture of 0.3 g. of paraformaldehyde and 0.85 g. of piperidine is warmed with 25 ml. of absolute ethanol until a clear solution is formed. This solution is cooled to room temperature and added to 2.84 g. of hexestrol monomethyl ether in 15 ml. of alcohol. The resulting mixture is allowed to stand at room temperature for one hour and then heated at reflux temperature for 16 hours. The alcohol is removed under reduced pressure and the residual product, 3-[4-hydroxy-3-(1-piperidinylmethyl)-phenyl]-4-(4-methoxyphenyl)-hexane, is dissolved in 200 ml. of ether. Dry hydrogen chloride gas is passed into the solution until it is saturated, the white solid is removed by filtration and recrystallized from alcohol-petroleum ether. The crystalline product is 3-[4-hydroxy-3-(1-piperidinylmethyl) - phenyl]-4-(4-methoxyphenyl)-hexane hydrochloride, M.P. 186° C. By substituting in this procedure, for piperidine, an equivalent quantity of 2-methylpiperidine one obtains, in crystalline form, the corresponding product, 3 - [4 - hydroxy-3-(N-2-methylpiperidinylmethyl) - phenyl]-4-(4-methoxyphenyl) - hexane hydrochloride, M.P. 195–200° C. Likewise, by substituting an equivalent quantity of hexamethyleneimine one obtains 3 - [4-hydroxy-3-(1 - hexamethyleneiminylmethyl)-phenyl]-4-(4-methoxyphenyl) - hexane hydrochloride, M.P. 202–210° C.

*Example 6*

2.84 g. of hexestrol monomethyl ether, 1.1 g. of 1-methylpiperazine and 0.33 g. of paraformaldehyde in 25 ml. of absolute ethanol is heated on a steam bath for two hours. The solvent is removed and the residual product, 3-[4-hydroxy-3-(1-methyl-4-piperazinylmethyl)-phenyl]-4-(4-methoxyphenyl)-hexane, is dissolved in 50 ml. of ether. Dry hydrogen chloride gas is added until saturation and the white precipitate is removed by filtration and recrystallized from alcohol. The crystalline product is 3-[4-hydroxy-3-(1-methyl-4-piperazinylmethyl) - phenyl] - 4 - (4 - methoxyphenyl) - hexane dihydrochloride monohydrate, M.P. 249–251° C. (dec.).

*Example 7*

An alcoholic mixture of 13.4 g. of diethylstilbestrol, 1.5 g. of paraformaldehyde and 3.8 g. of diethylamine is heated at reflux temperature for two hours. The solvent is removed under reduced pressure and the residue is dissolved in 50 ml. of ether. The ethereal solution is extracted three times with 5% potassium hydroxide solution. The alkaline extract is neutralized with dilute acetic acid, to give a solid which is extracted with ether, and dried over anhydrous sodium sulfate. The drying agent is removed and the ethereal solution is saturated with hydrogen chloride. The solid is collected by filtration, dissolved in 25 ml. of hot water and neutralized with dilute ammonia. The product, 3-(4-hydroxyphenyl)-4-(4-hydroxy-3-diethylaminomethylphenyl)-3-hexene, is removed by filtration and purified by recrystallization from dilute ethanol; M.P. 135–136° C.

*Example 8*

Into 25 ml. of absolute ethanol is placed 0.3 g. of paraformaldehyde and 1.6 ml. of 30% ethanolic dimethylamine. This mixture is gently heated until a clear solution is formed and then cooled to room temperature. A solution of 2.82 g. of diethylstilbestrol monomethyl ether in 10 ml. of absolute ethanol is added. After standing at room temperature for one hour, it is heated at reflux temperature for 10 hours, and the alcohol is removed by distillation in vacuo. The residual product, 3-(4-methoxyphenyl) - 4 - (4 - hydroxy - 3 - dimethylaminomethyl-phenyl)-3-hexene, is dissolved in ether and the ethereal solution is saturated with hydrogen chloride gas. The resulting precipitate is isolated by filtration and recrystallized from a mixture of alcohol and petroleum ether. The crystalline product is 3-(4-methoxyphenyl)-4-(4-hydroxy - 3 - dimethylaminomethylphenyl) - 3 - hexene hydrochloride, M.P. 203.5° C. By substituting in this procedure an equivalent amount of diethylamine for dimethylamine, one obtains the corresponding product, 3-(4 - methoxyphenyl) - 4 - (4 - hydroxy - 3 - diethylaminomethyl-phenyl)-3-hexene hydrochloride, M.P. 180–182° C.

*Example 9*

Into 25 ml. of absolute ethanol is placed 0.3 g. of paraformaldehyde and 0.9 g. of morpholine. This mixture is gently heated until a clear solution is formed and is then cooled to room temperature whereupon a solution of 2.82 g. of diethylstilbestrol monomethyl ether in 10 ml. of absolute ethanol is added. After standing at room temperature for one hour, the mixture is heated at reflux temperature for 10 hours and then the alcohol is removed in vacuo. The residual product, 3-(4-methoxyphenyl) - 4 - [4 - hydroxy - 3 - (4 - morpholinylmethyl)-phenyl]-3-hexene, is dissolved in ether and the ethereal solution saturated with hydrogen chloride gas. The gummy precipitate is removed by filtration and recrystallized from a mixture of acetone alcohol and petroleum ether. The product is 3-(4-methoxyphenyl)-4-[4-hydroxy-3-(4-morpholinylmethyl) - phenyl] - 3 - hexene hydrochloride, M.P. 183° C.

*Example 10*

Into 25 ml. of absolute ethanol is placed 0.3 g. of paraformaldehyde and 0.71 g. of pyrrolidine. This mixture is gently heated until a clear solution is formed and is then cooled to room temperature. A solution of 2.82 g. of diethylstilbestrol monomethyl ether in 10 ml. of absolute ethanol is added to the previous mixture. After standing at room temperature for one hour, it is heated at reflux temperature for 10 hours. The alcohol is removed in vacuo, the residue dissolved in ether and the ethereal solution saturated with hydrogen chloride gas. The gummy precipitate which forms is removed by filtration and decantation and recrystallized from a mixture of acetone, alcohol and petroleum ether to give 3-(4-methoxyphenyl) - 4 - [4 - hydroxy - 3 - (1 - pyrrolidinylmethyl)-phenyl]-3-hexene hydrochloride; M.P. 190° C.

*Example 11*

Into 25 ml. of absolute ethanol is placed 0.3 g. of paraformaldehyde and 1.0 g. of 1-methylpiperazine. The mixture is gently heated until a clear solution is formed and is then cooled to room temperature. A solution of 2.82 g. of diethylstilbestrol monomethyl ether in 10 ml. of ethanol is added. After standing at room temperature for one hour, it is heated at reflux temperature for 10 hours. The alcohol is removed by distillation in vacuo and the residue dissolved in ether. The ethereal solution is saturated with hydrogen chloride gas and the gummy precipitate which forms is removed and recrystallized from alcohol and from alcohol and petroleum ether to give 3 - (4 - methoxyphenyl) - 4 - [4 - hydroxy - 3-(1 - methyl - 4 - piperazinylmethyl) - phenyl] - 3 - hexene dihydrochloride, M.P. 187.5° C.

*Example 12*

Into 25 ml. of absolute alcohol is placed 0.3 g. of paraformaldehyde and 0.9 g. of piperidine. The reaction mixture is gently heated until a clear solution is formed and is then cooled to room temperature. A solution of 2.82 g. of diethylstilbestrol monomethyl ether in 10 ml. of alcohol is added to the above mixture. After standing at room temperature for one hour it is heated at reflux temperature for 10 hours. The alcohol is removed by distillation in vacuo and the residue dissolved in ether. The ethereal solution is saturated with hydrogen chloride and the gummy precipitate which forms is triturated with a spatula until it becomes a white solid and is then recrystallized from a mixture of alcohol and petroleum ether to give 3-[4-hydroxy-3-(1-piperidinylmethyl)-phenyl] - 4 - (4 - methoxyphenyl) - 3 - hexene hydrochloride, M.P. 178° C. By substituting for piperidine an equivalent quantity of hexamethyleneimine in this procedure, one obtains the corresponding product, 3-[4-hydroxy-3-(1 - hexamethyleneiminylmethyl) - phenyl] - 4 - (4-methoxyphenyl)-3-hexene hydrochloride, M.P. 195–200° C.

*Example 13*

(a) An alcoholic mixture of 14.9 g. of 3-ethyl-2,4-bis-(4-hydroxyphenyl)hexane, 1.5 g. of paraformaldehyde and 3.8 g. of diethylamine in 100 ml. of ethanol is heated at reflux temperature for two hours. The solvent is removed by distillation in vacuo and the residue is dissolved in ether. The ether solution is extracted three times with 5% potassium hydroxide solution. The alkaline extract is neutralized with dilute aqueous acetic acid to give a solid which is extracted with ether and the ethereal solution is dried over sodium sulfate. After removing the drying agent, the ether solution is saturated with hydrogen chloride. The solid is dissolved in hot water and neutralized with dilute ammonia. The product, 3-ethyl-4-(4-hydroxyphenyl) - 2 - (4 - hydroxy - 3 - diethylaminomethylphenyl)-hexane, is removed by filtration and purified by recrystallization from dilute ethanol, M.P. 135–136° C.

(b) The product of (a) is dissolved in ether and the ethereal solution treated with an excess of dry gaseous hydrogen bromide. The hydrobromide salt which separates from the solution is collected and purified by recrystallization from isopropanol. Likewise, the tartrate salt can be prepared by adding such an ether solution to isopropanol solution containing an equivalent amount of tartaric acid and recovery of the solid tartrate salt which separates on standing.

*Example 14*

0.6 g. of paraformaldehyde is added to 12 g. of diethylamine and the mixture is gently warmed to produce a solution. 5.4 g. of hexestrol is added and the reaction mixture is refluxed for three hours and the excess amine is removed by distillation in vacuo. The residue is taken up in 25 ml. of methanol and placed at 0 to 5° C. for 16 hours. The white precipitate is removed by filtration and the filtrate evaporated to dryness. The residual oil is taken up in ether and saturated with hydrogen chloride. The precipitate is removed and triturated with acetone. It is further triturated with cold water to give a relatively pure hydrochloride salt which on recrystallization from ethanol, acetone and ether gives 3-(4-hydroxyphenyl)-4-(4 - hydroxyphenyl - 3 - diethylaminomethylphenyl) - hexane hydrochloride, M. P. 226–226.5° C.

The hydrochloride is taken up in water and treated with sodium carbonate. The precipitate is removed and recrystallized from benzene and petroleum ether. The product is 3-(4-hydroxyphenyl)-4-(4-hydroxyphenyl-3-diethylaminomethylphenyl)-hexane, M.P. 130–131° C.

*Example 15*

A mixture of 2.8 g. of dienestrol monomethyl ether (M.P. 142°), 0.3 g. of paraformaldehyde and 0.71 g. of pyrrolidine in 25 ml. of absolute ethanol is heated at reflux temperature for two hours. The solvent is removed in vacuo, the residue dissolved in ether and the ethereal solution saturated with hydrogen chloride gas. The gummy precipitate, after decantation of solvent, is triturated with acetone. The resulting solid product is 3-(4 - methoxyphenyl) - 4 - [4 - hydroxy - 3 - (1 - pyrrolidinylmethyl)-phenyl]-2,4-hexadiene hydrochloride.

*Example 16*

A mixture of 3.3 g. of benzestrol monoethyl ether, 0.3 g. of paraformaldehyde and 1.0 g. of 1-methylpiperazine in 30 ml. of ethanol is heated under reflux for three hours. Excess hydrogen chloride is passed into the solution and the solvent removed. The residual product, 3-ethyl - 2 - (4 - ethoxyphenyl) - 4 - [4 - hydroxy - 3 - (1-methyl - 4 - piperazinylmethyl) - phenyl] - hexane dihydrochloride, can be purified if desired by recrystallization from alcohol-petroleum ether mixture. The starting material, benzestrol monoethyl ether, can be prepared by the procedure of Wilds et al., J.A.C.S., 70, 4128 (1948), for the monomethyl ether wherein dimethyl sulfate is replaced with diethyl sulfate.

*Example 17*

The residual product, 3-(4-hydroxy-3-dimethylaminomethylphenyl)-4-(4-methoxyphenyl)-hexane, obtained in accordance with the procedure of Example 2 is dissolved in 3.5 ml. of benzene. The solvent is removed by distillation until the distillate is clear, and then a constant stream of methyl chloride gas is bubbled through the solution for over a half hour. After standing for a few hours at room temperature, the resulting precipitate is collected by filtration. The product, 3-(4-hydroxy-3-dimethylaminomethylphenyl) - 4 - (4 - methoxyphenyl)-hexane methochloride, is purified by recrystallization from acetonitrile; M.P. 223–224° C.

*Example 18*

3 - (4 - methoxyphenyl) - 4 - [4 - hydroxy - 3 - (1 - pyrrolidinylmethyl)-phenyl]-3-hexene hydrochloride (1 g.) is taken up in water and treated with excess in aqueous ammonia. The resulting mixture is extracted with three 25-ml. volumes of ether, the ether extracts combined and dried over anhydrous sodium sulfate. The dried extracts are filtered, an excess of methyl iodide is added to the filtrate, and the mixture is allowed to stand for several hours at room temperature. The product, 3-(4-methoxyphenyl) - 4 - [4 - hydroxy - 3 - (1 - pyrrolidinylmethyl)-phenyl]-3-hexene methoiodide, is collected by filtration.

*Example 19*

2 g. of 3-(4-hydroxyphenyl)-4-(4-hydroxy-3-diethylaminomethylphenyl)-hexane, M.P. 130–131° C., is dissolved in 25 ml. of alcohol and an excess of ethyl iodide is added. After standing for two hours, the solvent is removed and the residue recrystallized from alcohol and acetonitrile to give 3-(4-hydroxyphenyl)-4-(4-hydroxy-3-diethylaminomethylphenyl)-hexane ethoiodide.

This application is a continuation-in-part of my copending application Serial No. 746,670 filed July 7, 1958, now abandoned.

I claim:
1. A member of the group consisting of a free base, acid addition salts thereof and the corresponding quaternary lower alkylammonium salts wherein the anion is a member selected from the group consisting of chloride, bromide, iodide, sulfate and para-toluene sulfonate, said free base having the formula,

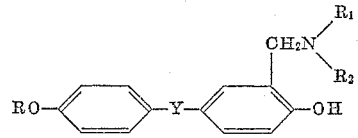

where R is a member of the group consisting of hydrogen and lower alkyl; $R_1$ and $R_2$ independently represent a member selected from the group consisting of lower alkyl and further members wherein $R_1$ and $R_2$ taken together with

represent a heterocyclic radical of the group consisting of pyrrolidino, piperidino, piperazino, morpholino, hexamethyleneimino and lower alkyl substituted derivatives thereof; and Y is a member of the group consisting of

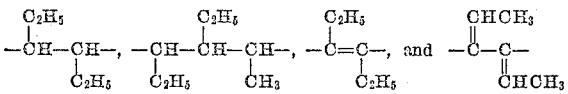

2. 3 - [4 - hydroxy - 3 - (1 - pyrrolidinylmethyl) - phenyl]-4-(4-methoxyphenyl)-hexane hydrochloride.
3. 3 - [4 - hydroxy - 3 - (N - 2 - methylpiperidinylmethyl)-phenyl]-4-(4-methoxyphenyl)-hexane hydrochloride.
4. 3 - (4 - hydroxy - 3 - diethylaminomethylphenyl) - 4-(4-methoxyphenyl)-hexane hydrochloride.
5. 3 - [4 - hydroxy - 3 - (1 - piperidinylmethyl) - phenyl]-4-(4-methoxyphenyl)-3-hexene hydrochloride.
6. 3 - [4 - hydroxy - 3 - (1 - piperidinylmethyl) - phenyl]-4-(4-methoxyphenyl)-hexane hydrochloride.
7. 3 - (4 - methoxyphenyl) - 4 - (4 - hydroxy - 3 - dimethylaminomethylphenyl)-3-hexene hydrochloride.
8. 3 - [4 - hydroxy - 3 - (1 - hexamethyleneiminylmethyl)-phenyl]-4-(4-methoxyphenyl)-hexane hydrochloride.
9. 3 - [4 - hydroxy - 3 - (4 - morpholinylmethyl) - phenyl]-4-(4-methoxyphenyl)-hexane hydrochloride.

References Cited in the file of this patent
UNITED STATES PATENTS
2,260,967    Bruson                Oct. 28, 1941